Aug. 18, 1959  R. C. ORTGIES  2,900,180
CUPOLA GAS RECEIVING AND COOLING SYSTEMS
Filed June 8, 1956  3 Sheets-Sheet 1

INVENTOR.
RAYMOND C. ORTGIES
BY Arthur Robert
atty

INVENTOR.
RAYMOND C. ORTGIES

Aug. 18, 1959 R. C. ORTGIES 2,900,180
CUPOLA GAS RECEIVING AND COOLING SYSTEMS
Filed June 8, 1956 3 Sheets-Sheet 3
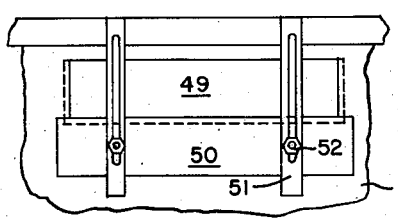
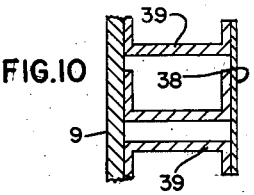
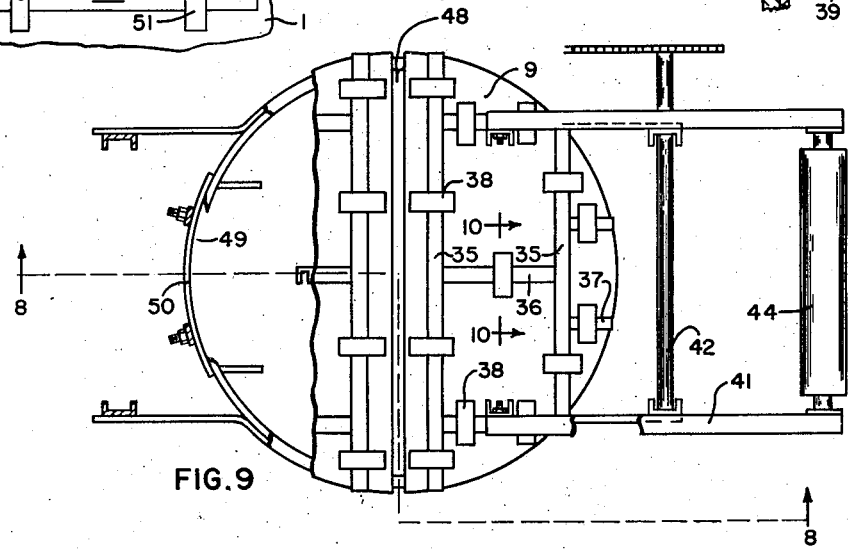
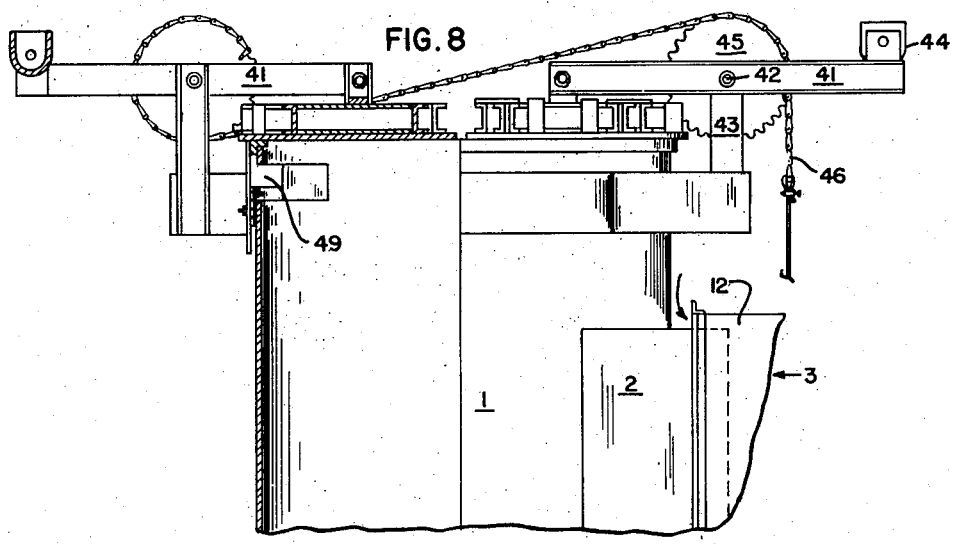
INVENTOR.
RAYMOND C. ORTGIES

United States Patent Office 2,900,180
Patented Aug. 18, 1959

2,900,180

CUPOLA GAS RECEIVING AND COOLING SYSTEMS

Raymond C. Ortgies, Louisville, Ky., assignor to American Air Filter Company, Inc., Louisville, Ky., a corporation of Delaware Application June 8, 1956, Serial No. 590,261

15 Claims. (Cl. 266—32)

The present invention relates to a gas receiving and cooling system for a pair of cupolas arranged for alternate operation and having a common cooling tower.

A typical cupola installation comprises: a pair of alternately operating cupolas spaced several feet apart; a common cooling tower spaced to one side thereof; and a separate outlet duct for each cupola, each duct extending from near the top of its cupola to the top of the cooling tower and operating to receive hot gases from the cupola and convey them to the cooling tower. The gases are spray cooled as they pass downwardly through the cooling tower and the cooled gases are subsequently cleaned in a dust separator. Since ordinarily one cupola is operated while the other is shut down to cool and be recharged, each cupola is provided with a cover which is closed during operation and open, to facilitate cooling, at other times.

In these arrangements, the differential vertical expansion and contraction between both of the cupolas and the cooling tower is taken up at the duct connections therebetween. As a result, these connections sometime break. It is also necessary that the cupola outlet ducts and cupola covers be made of a highly heat resistant material such as stainless steel to withstand temperatures up to 1800 degrees. If constructed of ordinary steel, they may burn out and require replacement. Failure to replace the burned-out members results in the admission of uncontrolled quantities of atmospheric air to the gas stream and a loss in the effectiveness of the exhauster.

The number of cooling tower spray nozzles actually operated from time to time varies, since the number required depends upon the temperature of the gases passing through the system. Those spray nozzles, which are not used during a given operation, often become plugged from a build up of dirt on their orifices. As a result, when the nozzles are supplied with water, the water in the supply piping, which extends within the gas stream, may become hot enough to vaporize and develop sufficient pressure to cause damage.

An object of the present invention is the provision of a gas receiving system which will withstand the passage of high temperature gases therethrough with a minimum of structural damage.

A more particular object is the provision of such a system which may be constructed of relatively inexpensive material and is trouble free in service.

A further object is the provision of an effective arrangement for cooling means in the system and which requires a minimum of maintenance.

The present invention resides in the novel construction and arrangement of the following: the connection between the cupolas and cooling tower; a damper in that connection; the support for that connection; the spray header protective means; the cupola cover; and an inside air shield for the cover.

In accordance with my invention, the cooling tower is positioned directly between the cupolas and a T connection is provided between the cupola outlets and the cooling tower inlet. A damper is positioned within the stembar junction of the T to close off either half of the T bar while leaving the other half openly connected with the stem to provide an inverted L-shaped gas passage extending horizontally from one cupola outlet and thence downwardly into the tower. The outlet of each cupola projects slightly into the adjacent end of the T bar and cooperates therewith to provide a peripheral space therebetween. This space accommodates relative movement between the cupolas, the T and the tower, due to differential expansion and contraction, and provides an inlet for atmospheric air, which cools the adjacent surfaces.

The damper is made hollow and provided with an outside air inlet and an inside air outlet to accommodate a flow of ventilating air therethrough.

The T is pivotably connected to and supported by both cupolas so that it accommodates relative movement therebetween, such as may be occasioned by the expansion of one cupola and the simultaneous contraction of the other, and thereby tends to maintain its proper air inlet connection adjacent the outlet of each cupola.

Each spray header (i.e. the nozzles and the supply pipe therefor), is located in a protective ventilating pipe which has an outlet opening through which the nozzle projects so that a flow of ventilating air is created which not only cools the supply pipe and nozzle, but is directed outwardly around the nozzle in a manner to carry dust outwardly away from the nozzle and thereby prevent the deposit of dust on the nozzle.

The top of each cupola is closed by a cover which comprises: a closure plate resting on the mouth of the cupola so that it may expand and contract relatively thereto; an openwork grid of reinforcing members slidably resting on the plate to reinforce the plate while permitting relative movement thereof; and a series of saddle members rigidly mounted on the plate to hold the grid slidably against the plate.

Preferably, the cover arrangement is made in the form of two semicircular halves, the adjacent edges of which are separated to provide a slot-like opening extending centrally across the top of the cupola. Also, an opening is made near the top of each cupola on its outer side wall, as distinguished from its inner side wall which contains the cupola outlet. With these openings, a continuous flow of air will pass across the operating cupola along the underside of the cover and thereby ventilate and protect that cover accordingly.

An embodiment of the invention is illustrated in the accompanying drawing wherein:

Figure 8 is a view, taken along line 8—8 of Figure 9, showing the upper end of the cupola at the left of Figure 1 with both semicircular covers in closed position;

Figure 9 is a partly broken top plan view of Figure 8;

Figure 10 is a fragmentary section taken on line 10—10 of Figure 9; and

Figure 11 is an elevational view of the adjustable opening and door on the circumference of the cupola.

Figure 6:
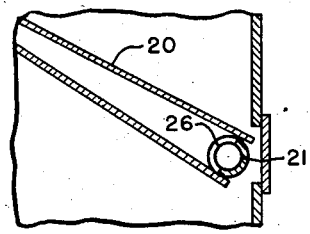
Figure 6 is a fragmentary sectional view taken on line 6—6 of Figure 5 and showing the damper in section.
Figure 7:
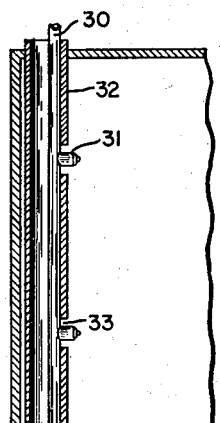
Figure 7 is a fragmentary sectional view taken on line 7—7 of Figure 4 and showing a spray header in the T connection.
Figure 2:
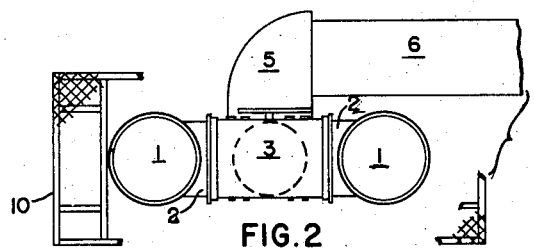
Figure 2 is a top plan view of Figure 1 with the catwalk broken away and with the cupolas' covers and associated parts omitted.
Figure 5:
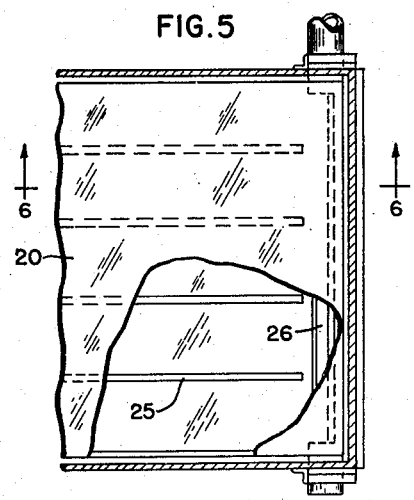
Figure 5 is a fragmentary sectional view taken on line 5—5 of Figure 4, this view including a partly broken elevational view of the damper.
Figure 1:
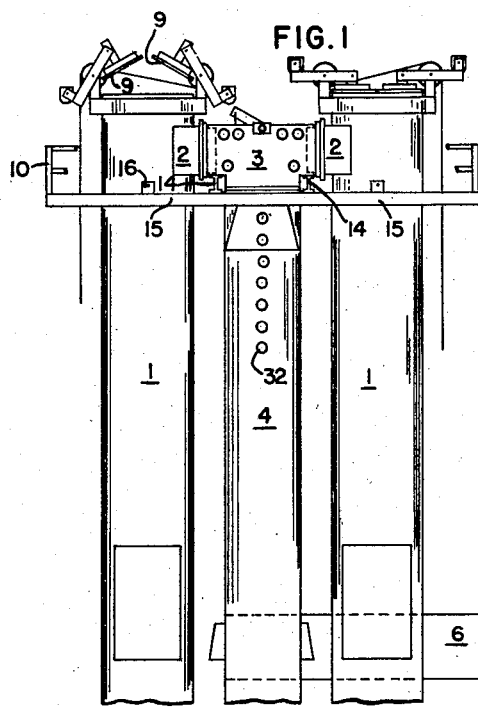
Figure 1 is a partly diagrammatic view of the system, this view showing, in front elevation, a pair of cupolas with a cooling tower interposed therebetween and with part of a conventional catwalk broken away.
Figure 4:
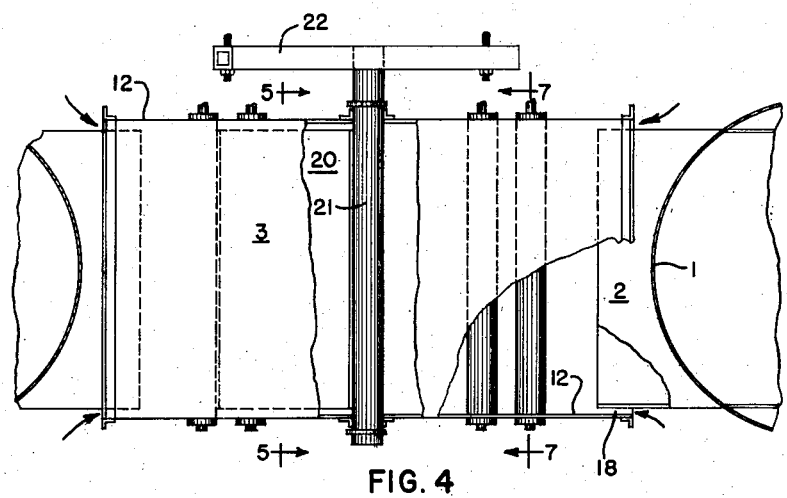
Figure 4 is a partly broken top plan view of Figure 3.

Referring to the drawings, there is shown a pair of horizontally spaced cupolas 1 with outlet ducts 2 near their upper ends, a T connection 3 with its horizontal bar located between the cupola outlets and its downwardly extending stem connecting with the top of a cooling tower 4. An elbow 5 connects the lower portion of the cooling tower 4 to a duct 6 leading to a remote dust separator 7 and exhauster 8. Each cupola has a pair of semicircular covers 9. A catwalk 10 extends around the upper end entire assembly.

The T 3 has an open-ended bar 12 of rectangular cross section extending between the cupola outlets and a stem 13 also of rectangular cross section, extending downwardly to the cooling tower 4. To support the T, the bottom walls of its bar 12 rest on a pair of horizontal longitudinal beams 14 extending, on both sides of the stem, from front to rear with their front and rear ends mounted on a second pair of horizontal cross beams 15 at right angles to the first pair. The cross beams 15, which extend tangentially past the front and rear walls respectively of the pair of cupolas, are pivotally supported therefrom at 16, the points of tangency. The cross beams may be a part of the catwalk 10.

Figure 3:
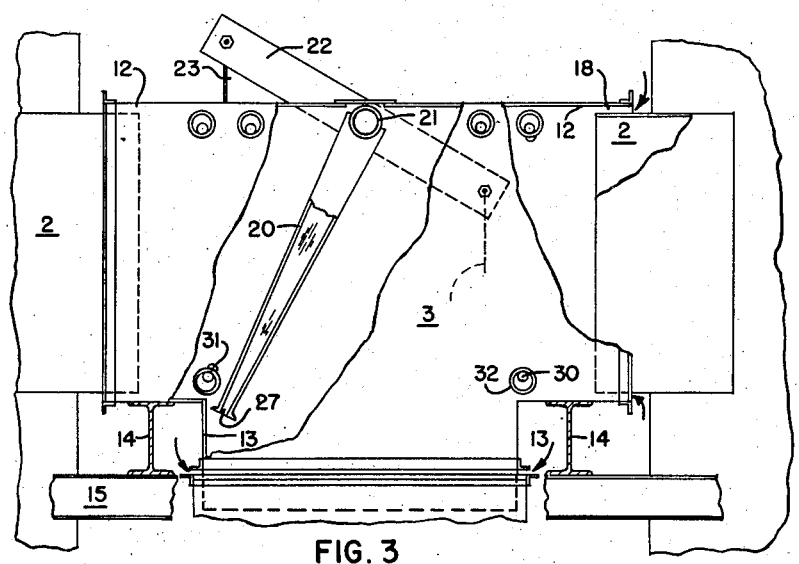
Figure 3 is a partly broken front elevation of the receiving T connection.

As best shown in Figure 3, each open end of the horizontal T bar 12 receives therewithin and laps the outer end of the adjacent cupola outlet duct 2, which is also of rectangular cross section. Preferably, the duct 2 is of sufficiently smaller cross sectional area than the bar 12 so as to leave a peripheral space 18 therebetween for the entry of a hollow rectangular column of ventilating air which serves to cool the adjacent parts of this connection and protect them accordingly. The stem 13, which is of circular cross section, extends downwardly into, and is lapped by, the open upper end of the cooling tower 4. These parts also cooperate to provide an inlet for the entry of a hollow column of air. Before passing, it may be noted that a perimetric angle-iron band may be provided at, or adjacent to, each open end of the T 3 and the upper open end of the tower 4.

Since the passage of hot gas from the duct 2 into the T 3 is directed, due to its inertia, against the ceiling of the T bar, the top of the space 18 between the duct 2 and the T bar ceiling preferably is made of greater magnitude than the bottom of that space so that a greater quantity of ventilating air may be drawn along the T bar ceiling. As a cupola heats up, when first placed in operation, it will elongate vertically due to expansion and thus carry its outlet duct 2 correspondingly upward. The pivotal connection of the T support to the expanding cupola causes the corresponding end of the T to move upwardly with the cupola and thereby not only prevents damage to the T connection but, at the same time, preserves the top space 18. As noted, the bottom of space 18 preferably is smaller than the top of space 18, but this bottom space should be large enough to accommodate the tilting movements of the T 3 during cupola expansion. The side wall spaces 18 are primarily provided to accommodate any relative lateral movement between the ducts 2 and the T 3.

A damper 20 is provided within the juncture of the T in order to shift the cupola connection to the cooling tower from one cupola to the other, as required. This damper is positioned to depend from a shaft 21 which extends centrally across the ceiling of the T from the front to the rear thereof, with its front and rear ends projecting forwardly and rearwardly through and mounted on the front and rear walls respectively of the T. The damper 20 is rotationally or angularly movable about the axis of shaft 21 from a left position, in which it closes the inner end of the left section of the T-bar 12, counterclockwise to a right position, in which it closes the inner end of the right section of T-bar 12. To effect this movement, one of its projecting ends is provided with a cross bar 22, the opposite ends of which carry operating cables 23.

In accordance with another feature of my invention, the damper 20 is made hollow and ventilated. Accordingly, it is composed of a pair of downwardly tapered end plates and a pair of downwardly converging face plates separated by correspondingly tapered ribs 25. The hollow interior of the damper communicates with the outside atmosphere through shaft 21 which is, therefore, made hollow, and cut away along its length to form an opening 26 within the damper so that outside air may enter the open ends of shaft 21 and pass through opening 26 thereof into the interior of the damper. This air is discharged into stem 13 through a slot 27 at the lower edge of the damper. The cooling effect on the damper minimizes in a substantial measure, if it does not eliminate, the tendency of the damper to warp or twist.

The gas stream is cooled by conventional spray headers composed of water supply pipes 30 containing spray nozzles 31 at desired intervals along its length. In accordance with another feature of this invention, however, these headers are protected by mounting each of them eccentrically within an open-ended protective pipe 32 which projects through the front and rear walls of the T with both of its ends communicating with the outside atmosphere. The protective pipe 32 is of comparatively large diameter, in relation to the supply pipe 30, and contains one opening 33 for each spray nozzle.

With this arrangement, it will be appreciated that the exhauster operates to create a flow of air from the outside atmosphere, through the protective pipe 32 and its nozzle accommodating openings 33, into the T. The holes 33 are dimensioned to compel the air to flow through them with sufficient velocity to reduce the tendency of dirt to deposit on the nozzles 31. Naturally, the cooling tower is also provided with spray headers enclosed within protective pipes.

It will be appreciated: that the provision of a protective pipe 32, of relatively large diameter, facilitates the removal and replacement of the spray headers at all times, even when the system is operating; that the air flowing within each pipe 32 has a considerable cooling effect on the supply pipe enclosed within it, thus minimizing the possibility of steam being generated within it in the event the nozzle plugs; and that the air, passing along the sides of a nozzle 31 through the holes 33, tends to decrease the build-up of dirt on the nozzle even when it is not discharging a spray.

As previously indicated, the top of each cupola is closed by a cover 9 which, in accordance with another feature of my invention, comprises: a closure plate, also designated 9, resting on the mouth of the cupola so that it is free to expand and contract relatively thereto; an integral openwork grid of C-shaped channel members slidably resting on the plate to reinforce it while permitting relative movement between the grid and plate; and a series of inverted U-shaped saddle members rigidly mounted on the plate to hold the grid slidably against the plate. The cover construction, preferably, is made in two halves so that the closure plate 9 comprises two semicircular plates, each of which is also designated by the numeral 9.

The openwork grid 35 includes: a pair of transversely spaced channel members, also designated 35, extending longitudinally from front to rear; and two sets of cross channel members 36 and 37, one set 36 extending between channels 35 of the first set and the other set 37 extending between one channel 35 of the first set and the periphery of the cover.

The saddle members 38 are positioned at frequent intervals along the channels of each set. Each saddle member 38 comprises: a top member 38 slidably engaging the top of a reinforcing member 35, 36 or 37 with its opposite ends projecting beyond the opposite sides of such reinforcing member; and a pair of C-shaped channel sections 39 of short length, one for anchoring each end of the top member 38 to the cover 9, each channel section 39 being welded to both the cover 9, and the top member 38. In other words, each saddle member forms an inverted U which straddles a reinforcing member of the grid 35 with its ends welded to the cover and its bight in slidable engagement with the straddled reinforcing member. The spacing between these parts is such as to permit relative movement horizontally in any direction.

The covers are supported for movement between open and closed positions by means of a pair of seesaw arms 41 which are pivotally mounted at 42 on a fixed frame structure 43 carried by the cupola and which carries the cover 9 pivotally at one end and a suitable counterweight 44 at the other end. The resulting seesaw structure may be rocked by means of a chain sprocket 45, connected to the seesaw arms 41 for rotational movement about their axis 42, and a cable 46 suitably connected to the periphery of the sprocket 45. The pivotal securement of the covers to the seesaw arms assures a proper seat on the cupola in the closed position.

The undersurfaces of the cover members 9 are shielded from the heat or ventilated, in accordance with another feature of this invention. To this end the adjacent diametric edges of both semicircular closure plates 9 are spaced from each other to provide a diametric slot 48. Also, each cupola 1 has its outer surface, as distinguished from its inner surface on which its gas outlet is mounted, provided with an air inlet opening 49 positioned slightly below its rim so as to create air flow through these openings across the upper end of the cupola and into the outlet duct 2. These air flows operate to shield the undersurface of the cover structure from the intense heat of the cupola and to ventilate such surfaces and thereby protect them against or, at least minimize the destructive effects of the heat generated within the cupola. The outer wall opening 49 preferably is provided with means for adjusting its cross-sectional area, the means shown comprising a gate 50 contoured to fit against the circularly curved outer wall of the cupola and adjustable secured thereto by means of slotted straps 51 and securing nuts 52.

It will be appreciated that by setting up a protective air flow across the upper end of each cupola, around the top of the gas column passing from the cupola into the T and again around the gas column passing downwardly from the T into the cooling tower, I protect those surfaces which are subject to the most intense heat. As a consequence, it becomes possible to construct the major part of this system from ordinary steel plate with the assurance that the protected surfaces will withstand prolonged service without failure.

Having described my invention, I claim:

1. A cupola-cooling tower system comprising: a first cupola having a lateral hot gas outlet near its top; an adjacent cooling tower having an inlet for said hot gas and an outlet for the cooled gas; and gas passage providing means connecting said cupola outlet to said tower inlet, said connecting means including a tubular fitting having a gas inlet end containing a gas inlet opening positioned to receive hot gas from said lateral outlet, said connecting means providing a ventilating air inlet positioned adjacent the gas inlet end of said fitting and arranged to direct incoming cool exterior air along an inner surface of said fitting to shield it from hot gas flowing through said fitting.

2. The system of claim 1 wherein: the outlet of said cupola is in the form of a laterally projecting tubular duct; and the inlet end of said fitting is in the form of a cross-sectionally larger duct positioned to receive and lap the outer end of said outlet duct in a spaced relationship to cooperate therewith to form said ventilating air inlet.

3. The system of claim 2 wherein: said ventilating air inlet is formed between the upper outer wall of said outlet duct and the inner ceiling wall of said fitting.

4. The system of claim 1 including: a second cupola having a lateral hot gas outlet near its top; and connecting means for the second cupola as specified for the first cupola.

5. The system of claim 4 wherein: both of said cupolas have their gas outlets on their inner sides which face each other; and said cooling tower is positioned between said inner sides.

6. The system of claim 5 wherein: said cupola outlets are in spaced opposed relationship; and said tubular fitting is in the form of a T with the opposite ends of its bar communicating with said opposed gas outlets of said cupolas and with its stem communicating with the inlet of said cooling tower.

7. The system of claim 6 wherein: the outlet of each cupola is in the form of a laterally projecting tubular duct; and each inlet end of said T is in the form of a cross-sectionally larger duct positioned to receive and lap the outer end of said outlet duct.

8. The system of claim 6 including: means supporting the T for tilting movement raising one of its bar ends relatively to the other.

9. The system of claim 8 wherein: said T supporting means includes a frame structure extending from one cupola to the other, pivotally connected to both cupolas and engaging the T between cupolas.

10. The system of claim 6 including: a damper mounted within the T to shift the connection of the cooling tower from one cupola to the other.

11. The system of claim 10 wherein: said damper is hollow; and means is provided to constrain air to flow from the outside atmosphere through the hollow damper into the T.

12. The system of claim 11 wherein: said hollow damper depends from a hollow shaft which projects through the walls of the T to outside atmosphere to provide a path for the flow of air from the outside through the shaft into the damper, the damper having an air outlet spaced downwardly from said hollow shaft.

13. The system of claim 1 including: a ventilation pipe extending across the gas passage between the cupola outlet and the cooling tower outlet, said pipe communicating with outside atmosphere at its ends and with said gas passage through at least one aperture between its ends; and a spray header extending within said pipe, said spray header being smaller than the interior of said pipe and having a nozzle positioned to cause spray water to pass through said pipe aperture and spray into said passage.

14. The system of claim 13 wherein: said ventilating pipe comprises a straight open ended pipe extending transversely across said gas passage.

15. A cupola structure comprising a shell open at its top, and a cover closing said top opening, said cover including: a closure plate resting upon the top of the shell so that it is free to expand and contract relatively thereto; an integral reinforcing structure slidably resting on said closure plate to reinforce it while permitting it to move relatively to the reinforcing structure, said structure having spaced beam sections; and a series of U-shaped saddle members inverted over said beam sections to straddle them, said saddle members being rigidly mounted on the plate to hold the reinforcing structure slidably against the plate.

References Cited in the file of this patent

UNITED STATES PATENTS

| | | |
|---|---|---|
| 132,974 | Miles | Nov. 12, 1872 |
| 374,190 | Kearney | Dec. 6, 1887 |
| 792,735 | Seaver | June 20, 1905 |
| 1,330,972 | Baldwin | Feb. 17, 1920 |
| 1,746,904 | Pike | Feb. 11, 1930 |
| 1,872,569 | Boegehold | Aug. 16, 1932 |
| 2,531,344 | Poland | Nov. 21, 1950 |
| 2,771,290 | Tinker | Nov. 20, 1956 |

FOREIGN PATENTS

| | | |
|---|---|---|
| 1,448 | Great Britain | May 26, 1865 |
| 1,006,172 | France | Jan. 16, 1952 |
| 148,537 | Australia | Oct. 7, 1952 |